United States Patent [19]
Katou et al.

[11] Patent Number: 5,913,722
[45] Date of Patent: Jun. 22, 1999

[54] CLEAN ROBOT

[75] Inventors: Keiji Katou, Hyogo; Masazumi Fukushima, Aichi, both of Japan

[73] Assignees: ShinMaywa Industries, Ltd., Nishinomiya; Murata Kikai Kabushiki Kaisha, Kyoto, both of Japan

[21] Appl. No.: 09/045,592

[22] Filed: Mar. 23, 1998

[30] Foreign Application Priority Data

Mar. 25, 1997 [JP] Japan ..................... 9-71373

[51] Int. Cl.⁶ ........................................ B25J 11/00
[52] U.S. Cl. ........................ 454/187; 414/940; 901/8
[58] Field of Search ................... 454/187; 901/7, 901/8, 50; 414/940

[56] References Cited

U.S. PATENT DOCUMENTS 5,527,390 6/1996 Ono et al. ..................... 118/719

FOREIGN PATENT DOCUMENTS 2507583 4/1996 Japan .
8-127405 5/1996 Japan .

*Primary Examiner*—Harold Joyce
*Attorney, Agent, or Firm*—Armstrong, Westerman, Hattori, McLeland & Naughton

[57] ABSTRACT

To allow an elevating body (17) in a clean robot (RB) installed in a clean room (R) to be located outside frames (4) without protruding from a swivel base (2) in order to enable the elevating body to be assembled and maintained easily and to ensure a wide elevating stroke. Two hollow frames (4, 4) extend vertically from the right and left sides of the rear of a swivel base (2) so as to be approximately symmetrical, a cover (9) is mounted between the frames (4, 4) and an elevating body (17) having a robot body (20) at its tip is accommodated in an elevating space (13) in the cover (9) and supported by rails (15) in the frames (4) so as to travel upward and downward. A blower (39) for air suction is located on the swivel base (2) and in front of each frame (4) to suck and exhaust the air in the elevating space (13) in the cover 9 via a suction port (36) allowing the elevating space (13) and the space in each frame (4) to communicate mutually and an exhaust port (40) to be opened in the front surface of the lower end of each frame (4).

3 Claims, 2 Drawing Sheets

CLEAN ROBOT

FIELD OF THE INVENTION

The present invention belongs to a technical field relating to a clean robot used in a clean room.

BACKGROUND OF THE INVENTION

In a known clean robot of this kind, an elevating body with its tip penetrating a slit in the front surface of a hollow frame extending vertically from a base and further extending to the exterior of the frame is accommodated in the frame so as to travel upward and downward, a ventilating path is partitioned off in the rear of the frame using a partition panel, and an inlet port is provided at the top of the partition panel to guide air from inside the frame to the ventilating path, while an exhaust port is provided to guide air from inside the ventilating path to a ventilator in the internal lower part of the frame, so that when the elevating body is elevating and its pumping action causes the air in the internal upper part of the frame to be pressed, the air is drawn from the inlet port in the partition panel to the ventilator via the ventilating path and exhaust port to prevent the pressed air in the frame from being ejected to the exterior of the frame, i.e., to the front of the robot through the slot in the front surface of the frame, thereby preventing dust from being diffused to a clean room using the small ventilator, as disclosed in Japanese Patent No. 2507583.

In a known warehouse robot, which is not a clean robot, two vertical frames (masts) are provided on a swivelling turntable and an elevating body having a wafer loading apparatus is supported between both frames so as to travel upward and downward so that the elevating body elevates and lowers to lift and lower the loading apparatus in order to transfer and load wafers, as shown in Japanese Patent Application Laid Open No. 8-127405.

In the former conventional example (Japanese Patent No. 2507583), the elevating body is built into the hollow frame, so it is inevitably very cumbersome to assemble and maintain the elevating body. If, however, the elevating body is located outside the frame, the tip of the elevating body protrudes from the base, thereby requiring a space to prevent the tip from colliding against an object around the robot when, for example, the base is swiveled around the swiveling center.

In addition, since the ventilator is provided in the internal lower part of the frame in which the elevating body is accomodated, the lowering end position of the elevating body cannot be set near the base due to the interference from the ventilator, thereby preventing the elevating body from having a wide elevation stroke.

This invention is provided in view of these points, and its object is to improve the structure of the clean robot in order to allow the elevating body to be located outside the frames without protruding from the swivel base, thereby allowing the elevating body to be assembled and maintained easily and to have a wide elevating stroke.

SUMMARY OF THE INVENTION

To achieve this object, this invention provides two frames as in the conventional example (Japanese Patent Application Laid Open No. 8-127405). An elevating body is located in a space partitioned off by a cover between the frames, each frame is formed so as to be hollow, and air is introduced into the inside of the frames from the space so that the air in the frames is sucked and exhausted by a sucking means located in the lower front of each frame.

Specifically, a clean robot according to the present invention is characterized in that it comprises a swivel base that can swivel around a swiveling center; two hollow frames extending vertically from the right and left sides of the rear of the swivel base so as to be symmetrical relative to a longitudinal surface passing through the swiveling center; rails provided on the opposed sides of both frames and extending in the vertical direction; an elevating body supported between the rails so as to travel upward and downward and having a protruding member that protrudes forward; an operation means provided at the tip of the protruding member; a cover mounted between both frames, having an elevating space in which the elevating body can be accommodated so as to travel upward and downward, and having opened therein an elevating path into which the protruding member can be movably inserted; a suction port that allows the elevating space in the cover and the space in each frame to communicate mutually; an exhaust port opened in the front surface of the lower end of each of the frames to allow the inside of the frame to communicate with its outside; and an air suction means located on the swivel base and in front of each of the frames and connected to the exhaust port.

In this configuration, when the robot is operated, the cover is set between the two hollow frames, and the elevating body is guided along the rails on the frames to travel upward and downward through the elevating space in the cover, with the protruding member protruding from the elevating path to the exterior of the cover. Various operations of the robot can be performed using the operation means at the tip of the protruding member. In addition, the air suction means located on the swivel base and in front of each frame is operated to allow air from inside the elevating space to flow into the space in each frame via the suction port. From this space, the air passes through the exhaust port in the front surface of the lower end of each frame and is sucked by the suction means, thereby ejecting contaminated air in the elevating space that contains dust from the frictional part of the elevating body.

In this case, the elevating body is supported so as to travel upward and downward while being guided by the rails between both frames. Consequently, although the elevating body is accommodated in the elevating space in the cover, the assembly or maintenance of the elevating body can be carried out easily by removing the cover.

In addition, since the frames extend vertically from the right and left sides of the rear of the swivel base so as to be symmetrical relative to the longitudinal surface passing through the swiveling center, the elevating body supported between both frames is located at the swivelling center of the swivel base to prevent the elevating body from protruding from the base, thereby eliminating the need to provide a space around the robot that is required to avoid the interference of the tip of the elevating body. Thus, the spatial efficiency of the robot can be increased.

Furthermore, the air suction means is located on the swivel base and in front of each frame so as not to obstruct the elevating body, which travel upward and downward between both frames. Thus, the lowering end of the elevating body can be set near the swivel base to provide a wide elevating stroke. Furthermore, the air suction means can be installed on the swivel base and in a dead space in front of each frame in order to prevent it from protruding from the swivel base.

According to the present invention, the suction port is formed at least at the upper and lower ends of each frame.

Thus, when the elevating body is traveling upward and downward through the elevating space in the cover and is near its upper or lower movement end position and even if the pumping action of the elevating body causes the air near the upper or lower end of the elevating space to be pressed and ejected from the elevating path to the exterior of the cover, the air can be positively drawn into the space in each frame through the suction ports to effectively prevent contaminated air from being ejected to the exterior of the robot.

According to the present invention, the cover has the front and rear cover members located at an interval. This configuration enables the easy removal and thus the easy assembly and maintenance of the elevating body.

DETAILED DESCRIPTION OF THE PREFERRED EMBODIMENTS

Figure 1:
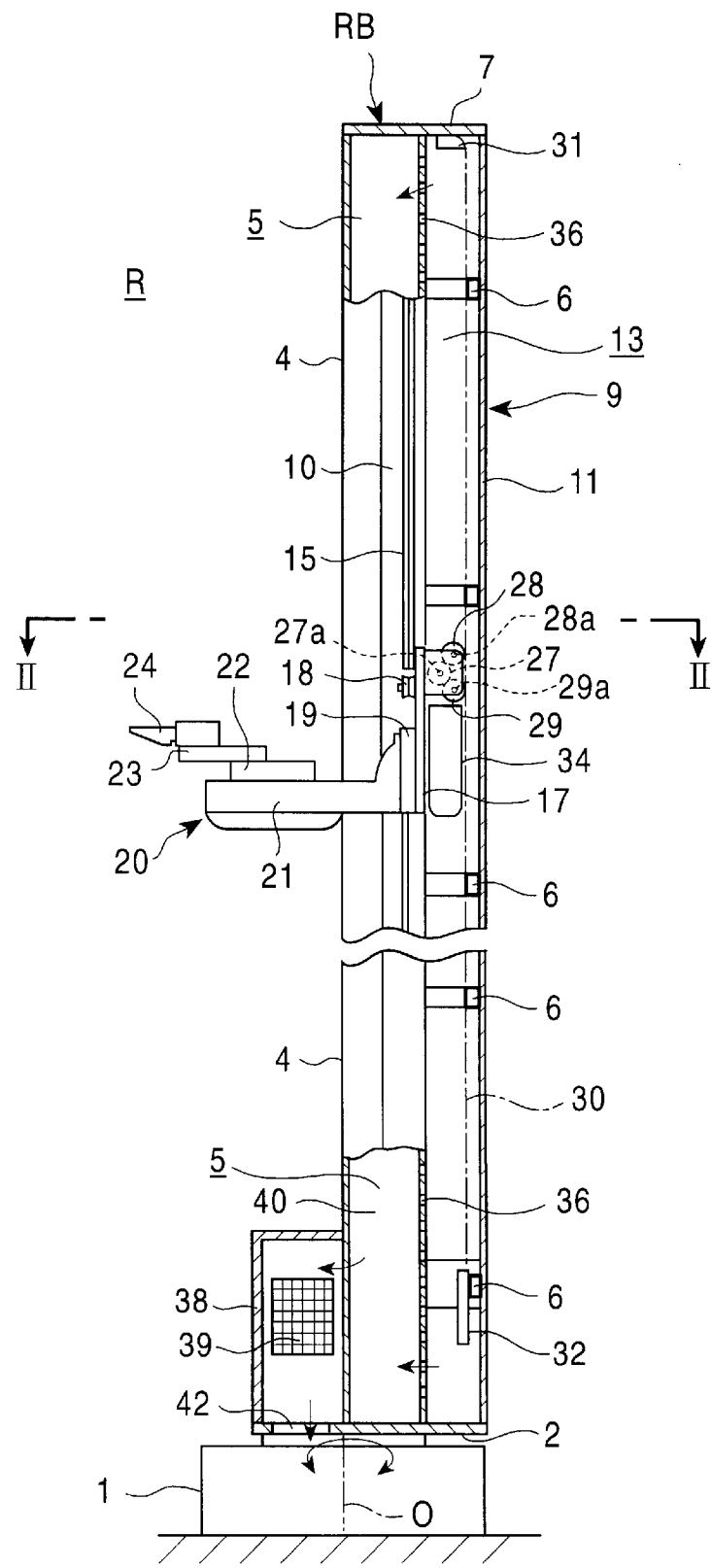
FIG. 1 is a partially exploded side view of a clean robot according to an embodiment of this invention.
Figure 2:
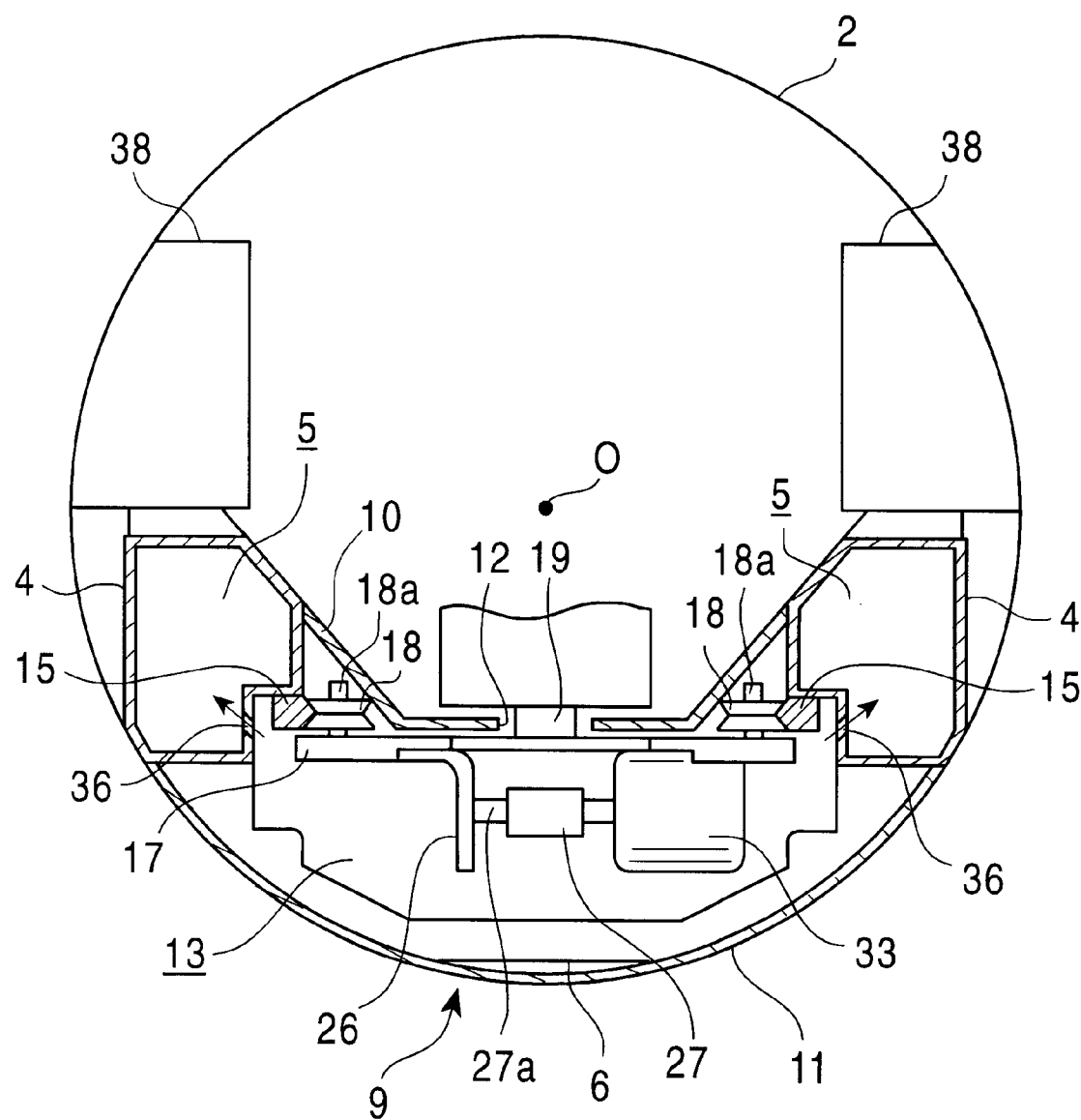
FIG. 2 is an enlarged sectional view taken along line II—II in FIG. 1.

FIGS. 1 and 2 shows a clean robot RB according to an embodiment of the present invention that is installed in a clean room R having a predetermined down-flow of indoor air. In FIGS. 1 and 2, 1 is a base installed so as to be fixed to a floor surface in the clean room R or to move along rails (not shown in the drawing) and a swivel base 2 having a planar shape approximately that of a circle is supported on the base 1 in such a way as to swivel around a swiveling center 0. Two right and left hollow frames 4, 4 shaped like hollow columns extend vertically from the right and left sides of the rear (the right in FIG. 1 and the lower part in FIG. 2) of the swivel base 2 so as to be approximately symmetrical relative to a longitudinal surface passing through the swiveling center 0. A space 5 is formed inside each frame 4. The frames 4, 4 are integrally connected together at the middle section of each height using a plurality of connecting members 6, 6, . . . extending along the rear periphery of the swivel base 2 as seen from the top.

A cover 9 covering the connecting members 6, 6, . . . and an elevating body 17 described below, is mounted between the right and left frames 4, 4 so as to cover the overall frames 4 from their upper end to lower end. The upper end of the cover 9 is closed in an air-tight manner by a common cap member 7 that closes the upper ends of the frames 4, 4, while the lower end is closed by the swivel base 2 in an air-tight manner. The cover 9 has a front and a rear cover members 10 and 11 located at an interval, and the front cover member 10 has a U-shaped cross section and is opened in its front, and its right and left ends are joined with the front ends of the opposed sides of the right and left frames 4, 4, respectively, in an air-tight manner.

In addition, an elevating path 12 consisting of a long hole that extends in the vertical direction and into which a protruding member 19, which is described below, is movably inserted is opened at the lateral center of the cover member 10. On the other hand, the rear cover member 11 has a circular cross section and extends along the rear periphery of the swivel base 2 as seen from the top, and its right and left ends are joined with the rear ends of the outer sides of the frames 4, 4, respectively, in an air-tight manner. The space surrounded by the front and rear cover members 10 and 11, cap member 7, and swivel base 2 is an elevating space 13 in which the elevating body 17 is accommodated in such a way as to travel upward and downward.

Rails 15, 15 located in the elevating space 13 in the cover 9 and extending in the vertical direction are fixed to the rear of the opposed sides of both frames 4, 4, respectively. In addition, the elevating body 17 is accommodated inside the elevating space 13. The elevating body 17 is shaped like a plate extending in the vertical direction. Rollers 18, 18 engaged with and supported by the rails 15, 15 are rotatably supported on the right and left edges of the front surface of the elevating body 17 via longitudinal shafts 18a, 18a. The engagement of each roller 18 with the rail 15 allows the elevating body 17 to be supported by the rails 15, 15 so as to travel upward and downward.

A protruding member 19 is integrally formed in the lateral center of the front surface of the elevating body 17 and is vertically movably inserted into the elevating path 12 in the cover member 10. A robot body 20 includes a base 21 integrally mounted on the front end of the protruding member 19 and extending in the longitudinal direction, and the tip of the base 21 extends to the front end of the swivel base 2 as seen from the top. The proximal end of a first arm 22 is supported on the base 21 so that the first arm 22 can oscillate around its vertical axis, the proximal end of a second arm 23 is supported at the tip of the first arm 22 so that the second arm 23 can oscillate around its vertical axis, and a clamp apparatus 24 acting as a means for operting the robot RB is supported at the tip of the second arm 23 so as to oscillate around its vertical axis. The arms 22, 23 and the clamp apparatus 24 are driven by their respective drive apparatuses (not shown in the drawings).

A lateral pair of brackets 26, 26 (only one of them is shown in the drawing) are integrally mounted on the rear surface of the elevating body 17, and a drive pulley 27 consisting of a toothed pulley and a vertical pair of free pulleys 28, 29 are rotatably supported on both brackets 26, 26 through horizontal shafts 27a to 29a. A toothed belt 30 is wound around the three pulleys 27 to 29. That is, the toothed belt 30 extends in the vertical direction between an upper belt stop 31 fixed to the upper end of the elevating space 13 and a lower belt stop 32 fixed to the connecting member 6 located at the lower end of the elevating space 13. After extending in the vertical direction, the toothed belt 30 bends at the upper free pulley 28, extends in the horizontal direction, meshes with the drive pulley 27, and then extends horizontally backward. It is then wound around the lower free pulley 29 so as to bend in the vertical direction.

Furthermore, an output section of a speed reducer 33 mounted on the rear surface of the elevating body 17 is attached to the shaft 27a of the drive pulley 27 and an output shaft of a servo motor 34 similarly mounted is connected to an input section of the speed reducer 33 so that the rotation of the servo motor 34 is reduced by the speed reducer 33 and then transmitted to the drive pulley 27 in order to rotate the servo motor 34 and withdraw the toothed belt 30 using the drive pulley 27, thereby elevating or lowering the elevating body 17.

A large number of suction ports 36, 36, . . . are opened in the opposed sides of the frames 4 behind the rails 15,15 at a predetermined interval in such a way as to be located all over the surface in the longitudinal (vertical) direction, including the upper and lower ends of the frame 4, and the suction ports 36 allow the elevating space 13 in the cover 9 to communicate with the space 5 in each frame 4.

Furthermore, a hermetically closed blower case 38, including as part of its wall the swivel base 2 and each frame 4, is mounted on the swivel base 2 and in front of each frame 4, and a blower 39 is accommodated in the blower case 38 as an air suction means. An exhaust port 40 is opened in the front surface of the lower end of each frame 4 that constitutes the side wall of the blower case 38, and the exhaust port 40 allows the space 5 in the frame 4 to communicate with the space in the blower case 38 that is outside the frame 4, thereby allowing the blower 39 to be connected to the space 5 in each frame 4 via the exhaust port 40. In addition, an air ejection port 42 is opened in the swivel base 2 constituting the bottom wall of the blower case 38 so that the blower 39 is operated to cause the air in the elevating space 13 in the cover 9 to be drawn into the blower case 38 via the suction ports 36, 36, . . . , space 5 in the frame 4, and the exhaust port 40, and then to be exhausted from the blower case 38 to the exterior of the robot RB via the air ejection port 42.

Thus, according to this embodiment, while the robot RB is operating, the servo motor 34 is operated to rotate the drive pulley 27 in order to elevate and lower the elevating body 17 through the elevating space 13 in the cover 9 while being guided by the rails 15, 15 in the right and left frames 4, 4 and allowing the protruding member 19 to protrude from the elevating path 12 in the cover member 10 to the exterior of the cover 9. Both arms 22, 23 and the clamp apparatus 24 of the robot body 20 provided at the tip of the protruding member 19 are operated, and the clamp apparatus 24 performs various operations, for example, it clamps a film formation substrate.

In addition, while the robot RB is operating, the blower 39 located on the swivel base 2 and in front of each frame 4 is activated. When the blower 39 is activated, the air in the elevating space 13 in the cover 9 flows into the space 5 in the frame 4 via the suction ports 36, 36, . . . , of each frame 4 is drawn from the space 5 into the blower case 38 via the exhaust port 40 in the front surface of the lower end of each frame 4, and is then exhausted from the blower case 38 to the lower part of the clean room R via the air ejection port 42 in the swivel base 2 (the air exhausted from the blower case 38 to the exterior of the robot RB via the air ejection port 42 is sucked into the space (not shown in the drawings) in the lower part of the clean room R near its floor surface due to the down flow in the room R and is then exhausted to the exterior of the clean room R). Thus, even if dust occurs in the wrapping portion between the pulleys 27 to 29 and the toothed belt 30 due to friction as the elevating body 17 repeats elevating and lowering operations through the elevating space 1, contaminated air containing the dust is ejected from the elevating air 13 to the clean room R through the bottom of the clean robot RB. This configuration prevents the contaminated air in the elevating space 13 from being directly emitted from the robot RB to the vertical center of the clean room R, thereby preventing the clean room R from being contaminated by the robot RB.

When the elevating body 17 is elevating or lowering through the elevating space 13 in the cover 9 and is near its elevating or lowering end position, the pumping action of the elevating body 17 may cause the air at the upper and lower ends of the elevating space 13 to be pressed and ejected from the elevating path 12 to the exterior of the cover 9. According to this embodiment, however, since the large number of suction ports 36, 36, . . . are formed all over each frame 4, the air can be positively drawn from the suction ports 36, 36, . . . into the space 5 in each frame 4 to effectively prevent contaminated air from being ejected to the exterior of the robot RB.

In addition, the elevating body 17 is supported between the frames 4, 4 so as to be elevated and lowered while being guided by the rails 15,15 provided on the opposed sides of the frames 4,4, so when the assembly or maintenance of the elevating body 17 is carried out, the cover 9 can be removed to facilitate handling of the elevating body 17.

Furthermore, since the frames 4, 4 extend vertically from the right and left sides of the rear of the swivel base 2 so as to be symmetrical relative to a longitudinal surface passing through the swivelling center 0, the elevating body 17 supported between both frames 4, 4 is located at the swivelling center 0 of the swivel base 2. This configuration can prevent the elevating body 17 from protruding from the swivel base 2, thereby eliminating the need to provide a space around the robot RB that is required to avoid the interference of the tip of the elevating body 17 when the swivel base 2 is swiveled around the swivelling center 0. As a result, the spatial efficiency of the robot RB can be increased.

In addition, since the blower 39 is located on the swivel base 2 in front of each frame 4, it is prevented from obstructing the elevating and lowering operations of the elevating body 17 to allow its lowering end position to be set near the swivel base 2, thereby providing a wide elevating stroke. Furthermore, the blower 39 is installed on the swivel base 2 in front of each frame 4. This configuration can prevent the blower 39 from protruding from the swivel base 2.

Although in the above embodiment, the elevating path 12 in front of the cover member 12 is open, it may be closed by a closing body operative in response to the elevating and lowering operations of the elevating body 17.

As described above, according to the clean robot of the present invention, the two hollow frames extend vertically from the right and left sides of the rear of the swivel base so as to be approximately symmetrical, the cover is mounted between the frames, and the elevating body having the operation means at its tip is accommodated in the elevating space in the cover and supported by the rails in the frames so as to travel upward and downward. The air suction means is located on the swivel base and in front of each frame to suck and exhaust the air in the elevating space in the cover via the suction port allowing the elevating space and the space in each frame to communicate mutually and the exhaust port opened in the front surface of the lower end of each frame. In this manner, the assembly and maintenance of the elevating body can be executed easily, and the elevating body can be prevented from protruding from the swivel base to improve the spatial efficiency of the robot RB. Furthermore, the interference between the air suction means and the elevating body can be avoided to allow the elevating body to provide a wide elevating stroke, and the air suction means can be located on a dead space on the swivel base so as not to protrude from the swivel base.

According to the present invention, the suction port is formed at least at the upper and lower ends of each frame. Accordingly, when the elevating body is elevating or lowering and is near its elevating or lowering end position and even if the pumping action of the elevating body causes the air near the upper or lower end of the elevating space to be pressed, the air can be positively drawn into the hollow space in each frame through the suction ports to effectively prevent contaminated air from being ejected to the exterior of the robot.

According to the present invention, the cover is divided into the front and rear cover members. This configuration enables-easy removal and thus the easy assembly and maintenance of the elevating body.

I claim:

1. A clean robot characterized in that it comprises:

a swivel base that can swivel around a swiveling center;

two hollow frames extending vertically from the right and left sides of the rear of the swivel base so as to be symmetrical relative to a longitudinal surface passing through said swiveling center;

rails provided on the opposed sides of both frames and extending in the vertical direction;

an elevating body supported between the rails so as to travel upward and downward and having a protruding member that protrudes forward;

an operation means provided at the tip of said protruding member;

a cover mounted between both of said frames, having an elevating space in which said elevating body can be accommodated so as to travel upward and downward and having opened therein an elevating path into which said protruding member can be movably inserted;

a suction port that allows the elevating space in said cover and the space in each frame to communicate mutually;

an exhaust port opened in the front surface of the lower end of each of said frames to allow the inside of the frame to communicate with its outside; and an air suction means located on the swivel base and in front of each of said frames and connected to said exhaust port.

2. A clean robot as in claim 1 characterized in that the suction port is formed at least at the upper and lower ends of each frame.

3. A clean robot as in claim 1 or claim 2 characterized in that the cover has a front and a rear cover member located at an interval.

* * * * *